(12) United States Patent
Devarakonda et al.

(10) Patent No.: US 10,094,275 B2
(45) Date of Patent: Oct. 9, 2018

(54) OPERATION SCHEDULING FOR OPTIMAL PERFORMANCE OF HYBRID POWER PLANTS

(71) Applicant: General Electric Company, Schenectady, NY (US)

(72) Inventors: Maruthi Narasinga Rao Devarakonda, Waukesha, WI (US); Rachel Tarvin Farr, League City, TX (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 292 days.

(21) Appl. No.: 15/006,519

(22) Filed: Jan. 26, 2016

(65) Prior Publication Data
US 2017/0211468 A1    Jul. 27, 2017

(51) Int. Cl.
*F01N 3/00*    (2006.01)
*F02B 73/00*    (2006.01)
(Continued)

(52) U.S. Cl.
CPC ............... *F02B 73/00* (2013.01); *B01D 53/94* (2013.01); *B01D 53/9431* (2013.01); *B01D 53/9495* (2013.01); *F01K 13/02* (2013.01); *F01K 23/00* (2013.01); *F01N 3/20* (2013.01); *F01N 3/208* (2013.01); *F01N 9/00* (2013.01);
(Continued)

(58) Field of Classification Search
CPC  B01D 53/94; B01D 53/9431; B01D 53/9495; F01K 13/02; F01K 23/00; F01N 2610/02; F01N 3/20; F01N 3/208; F01N 9/00; F02B 73/00; F02C 9/00; F02D 41/0235; F02D 41/14; F05D 2220/32
See application file for complete search history.

(56) References Cited

U.S. PATENT DOCUMENTS 6,701,707 B1 * 3/2004 Upadhyay ............... F01N 3/208
                                                                        60/276
7,836,680 B2 * 11/2010 Schwarz .................. F01D 15/10
                                                                        60/225
(Continued)

OTHER PUBLICATIONS

International Search Report and Written Opinion issued in connection with corresponding PCT Application No. PCT/US2017/13877 dated May 10, 2017.

*Primary Examiner* — Jesse Bogue
(74) *Attorney, Agent, or Firm* — Fletcher Yoder, P.C.

(57) ABSTRACT

A system includes a hybrid power plant controller programmed to receive a plurality of signals representative of one or more operating parameters of a hybrid power plant. The hybrid power plant includes at least one gas turbine engine, at least one gas engine, and at least one catalyst system. The hybrid power plant controller is programmed to utilize closed-loop optimal control to generate one or more operational setpoints based on the one or more operating parameters for the hybrid power plant to optimize performance of the hybrid power plant. The hybrid power plant controller uses closed-loop optimal control to provide the one or more operational setpoints to respective controllers of the at least one gas turbine engine, the at least one gas engine, and the at least one catalyst system to control operation of the gas turbine engine, the gas engine, and the catalyst system.

20 Claims, 4 Drawing Sheets

(51) Int. Cl.
*F01N 3/20* (2006.01)
*F02D 41/14* (2006.01)
*B01D 53/94* (2006.01)
*F02D 41/02* (2006.01)
*F02C 9/00* (2006.01)
*F01N 9/00* (2006.01)
*F01K 13/02* (2006.01)
*F01K 23/00* (2006.01)

(52) U.S. Cl.
CPC ............ *F02C 9/00* (2013.01); *F02D 41/0235* (2013.01); *F02D 41/14* (2013.01); *F01N 2610/02* (2013.01); *F05D 2220/32* (2013.01); *F05D 2270/05* (2013.01); *F05D 2270/07* (2013.01); *F05D 2270/08* (2013.01); *F05D 2270/13* (2013.01)

(56) References Cited

U.S. PATENT DOCUMENTS

| | | | |
|---|---|---|---|
| 8,756,180 | B2 | 6/2014 | Pandey et al. |
| 8,914,134 | B2 | 12/2014 | D'Amato et al. |
| 9,002,530 | B2 | 4/2015 | O'Connor et al. |
| 2008/0006739 | A1* | 1/2008 | Mochida ................ B64C 27/04 244/60 |
| 2008/0277533 | A1* | 11/2008 | Schwarz .................. F02C 5/06 244/53 B |
| 2013/0291826 | A1* | 11/2013 | McAlister ............... F02B 19/00 123/254 |
| 2014/0007574 | A1 | 1/2014 | Pegg et al. |
| 2014/0366547 | A1* | 12/2014 | Kraft ...................... F02C 7/224 60/772 |
| 2015/0020529 | A1 | 1/2015 | Hoskin et al. |
| 2015/0184549 | A1 | 7/2015 | Pamujula et al. |
| 2017/0175604 | A1* | 6/2017 | Devarakonda .......... F01N 3/208 |

\* cited by examiner

OPERATION SCHEDULING FOR OPTIMAL PERFORMANCE OF HYBRID POWER PLANTS

BACKGROUND

The subject matter disclosed herein relates to a hybrid power plant and, more specifically to operational control of the hybrid power plant.

Hybrid power plants (e.g., including a combination of internal combustion engines such as gas engines and gas turbines) generate power utilizing a combination of different resources. These resources may generate various emissions (e.g., nitrogen oxides ($NO_x$), carbon monoxide (CO), ammonia ($NH_3$)). Given the number of components within the hybrid power plant, there may be a new to improve the monitoring and operation of the hybrid power plant to improve its efficiency.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, a system includes a hybrid power plant controller programmed to receive a plurality of signals representative of one or more operating parameters of a hybrid power plant. The hybrid power plant includes at least one gas turbine engine, at least one gas engine, and at least one catalyst system, where the hybrid power plant controller is programmed to utilize closed-loop optimal control to generate one or more operational setpoints based on the one or more operating parameters for the hybrid power plant to optimize performance of the hybrid power plant. The hybrid power plant controller also uses closed-loop optimal control to provide the one or more operational setpoints to respective controllers of the at least one gas turbine engine, the at least one gas engine, and the at least one catalyst system to control operation of the at least one gas turbine engine, the at least one gas engine, and the at least one catalyst system.

In a second embodiment, a system includes a hybrid power plant that includes a gas turbine engine, a gas engine, and a catalyst system. The catalyst system treats emissions from both the gas turbine engine and the gas engine. The catalyst system includes an oxidation catalyst assembly and a selective catalytic reduction (SCR) catalyst assembly. The system includes a plurality of sensors disposed throughout the hybrid power plant, where the plurality of sensors detect a plurality of operating parameters of the hybrid power plant. The system includes a controller coupled to the gas turbine engine, the gas engine, and the catalyst system, where the controller is programmed to receive a plurality of signals representative of the plurality of operating parameters from at least the plurality of sensors, to utilize closed-loop optimal control to generate a plurality of operational setpoints based on the plurality of operating parameters of the hybrid power plant to optimize performance of the hybrid power plant, and to provide respective operational setpoints of the plurality of operation setpoints to respective controllers of the gas turbine engine, the gas engine, and the catalyst system to control operation of the gas turbine engine, the gas engine, and the catalyst system.

In a third embodiment, a method includes operating a hybrid power plant having a gas turbine engine, a gas engine, and a catalyst system. The method includes receiving, at a processor, a plurality of signals representative of a plurality of operating parameters of the hybrid power plant, utilizing, via the processor, closed-loop optimal control to generate a plurality of operational setpoints based on the plurality of operating parameters to optimize performance of the hybrid power plant, providing, via the processor, respective setpoints of the plurality of operational setpoints to respective controllers of the gas turbine engine, the gas engine, and the catalyst system to control operation of the gas turbine engine, the gas engine, and the catalyst system, and operating, via the respective controllers, the gas turbine engine, the gas engine, and the catalyst system at the respective setpoints of the plurality of plurality of operation setpoints.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

Figure 1:
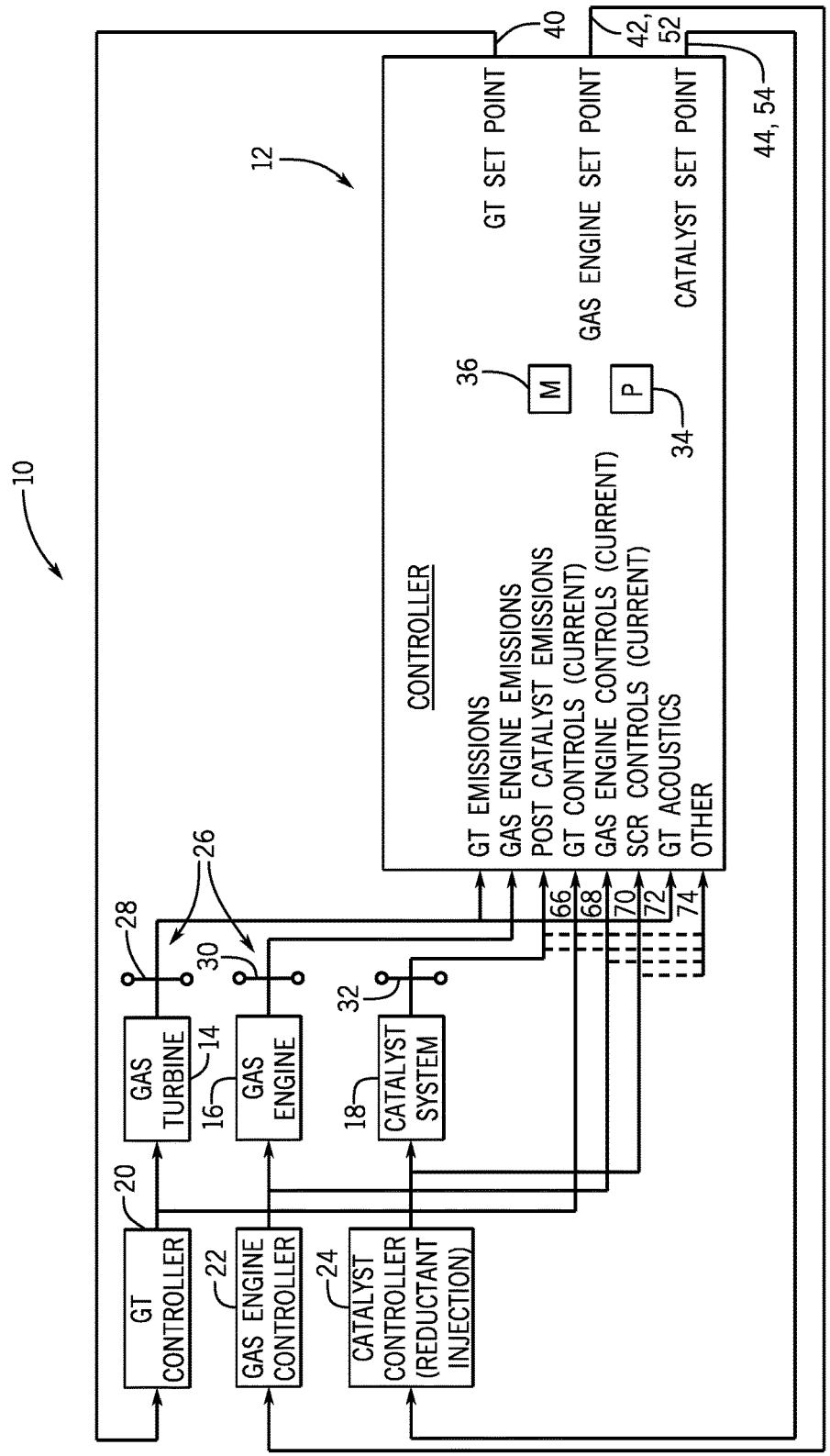
FIG. 1 is a schematic diagram of an embodiment of a hybrid power plant controller to a hybrid power plant.

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

The present disclosure is directed to systems and methods that utilize closed-loop optimized control for operating a hybrid power plant such that operational setpoints (e.g., target setpoints) are set for various equipment of the hybrid power plant based at least in part on operating parameters of the hybrid power plant. The hybrid power plant may include a gas turbine engine, a gas engine, a catalyst system, a controller (e.g., a hybrid power plant controller) coupled to the gas turbine engine, the gas engine, and the catalyst system, and a plurality of sensors disposed throughout the hybrid power plant. The controller utilizes closed-loop optimal control and a dynamic scheduler to determine an optimal operating setpoint for equipment in the hybrid power plant. For example, the controller may generate an optimal operating setpoint for the catalyst system, the gas engine, the gas turbine engine, or any combination thereof. The controller receives input representative of the gas turbine engine emissions, the gas engine emissions, and the catalyst system emissions. The controller also receives input from the gas turbine controller, the gas engine controller, and the catalyst system controller. In some embodiments, the controller may receive input representative of the resonance frequencies associated with the gas turbine engine, other hybrid power plant conditions, or a combination thereof. The dynamic scheduler may adjust the optimal operating setpoints for optimization of the performance of the hybrid power plant, a model-based control framework for strategy adaptations (e.g., a catalyst aging scenario), compliance with regulatory requirements, cost savings, and so forth. For example, the optimal operating setpoints may be optimized to run to the gas engine at its full load (e.g., maximum power) when a target power output demanded by the grid is requested while the turbine may run at a partial load, or vice-versa. As such, the operational setpoints that of the gas turbine, the gas engine, and the catalyst system drive each of the gas turbine, the gas engine, and the catalyst system to the most efficient operating point based on the plant constraints (e.g., emissions limits, fuel costs, maintenance costs).

Turning now to the drawings, FIG. 1 is a schematic diagram of an embodiment of a hybrid power plant controller 12 to a hybrid power plant 10. The hybrid power plant 10 may include a gas turbine engine 14, a gas engine 16 (e.g., piston engine), and a catalyst system 18. Each of the gas turbine engine 14, the gas engine 16, and the catalyst system 18 may be coupled to a controller (e.g., a gas turbine engine controller 20, a gas engine controller 22, and a catalyst system controller 24, respectively). As described in detail below, the hybrid power plant controller 12 utilizes closed-loop optimal control to generate one or more operational setpoints (e.g., target setpoints) for the gas turbine engine 14, the gas engine 16, and the catalyst system 18. The hybrid power plant controller 12 may include a dynamic scheduler to generate the one or more operational setpoints based on various operating parameters.

The hybrid power plant controller 12 includes processing circuitry (e.g., processor 34) and memory circuitry (e.g., memory 36). The processor 34 may execute instructions to carry out the operation of the hybrid power plant 10. Each of the gas turbine engine controller 20, the gas engine controller 22, and the catalyst system controller 24 may also include processing circuitry and memory circuitry.

The hybrid power plant controller 12 may receive input from various sensors 26 (e.g., gas turbine sensors 28, gas engine sensors 30, catalyst system sensors 32) disposed throughout the hybrid power plant 10 to generate the operational setpoints. The operational setpoints are based on various operating parameters of the hybrid power plant 10 to determine an optimized set of operating parameters to modify the control of the various hybrid power plant 10 components. For example, the hybrid power plant controller 12 may receive input from the gas turbine sensors 28 disposed upstream or downstream of the gas turbine engine 14. The hybrid power plant controller 12 may receive input representative of resonating frequencies of the gas turbine engine 14. Accordingly, the hybrid power plant controller 12 may generate a gas turbine operation setpoint 40 for controlling operation of the gas turbine engine 14 based in part on reducing the resonating frequency which may contribute to damage to the turbine or premature wear of the turbine components. The hybrid power plant controller 12 may receive input representative operating efficiencies (e.g., fuel consumption). The hybrid power plant controller 12 may generate the gas turbine operating setpoint 40 for controlling operation of the gas turbine engine 14 based in part on the operating efficiency. For example, the gas turbine operating setpoint 40 may include a megawatt signal for the at least one gas turbine engine 14.

The hybrid power plant controller 12 may also receive input from the gas engine sensors 30 in addition to the input received from the gas turbine sensors 28. The hybrid power plant controller 12 may utilize the input received from the gas engine sensors 30 disposed upstream or downstream of the gas engine 16 to generate a gas engine operational setpoint 42 for the controlling operation of the gas engine 16 based at least in part on emissions reductions, a desired operating efficiency of the gas engine 16, or both. The hybrid power plant controller 12 may generate a gas turbine operational setpoint 40 for the controlling operation of the gas turbine engine 14 based at least in part on emissions reductions, a desired operating efficiency of the gas turbine engine 14, or both. During operation, the engines (e.g., gas turbine engine 14, gas engine 16) generate combustion gases used to apply a driving force to a component of the engines 14, 16 (e.g., one or more pistons or turbines). The combustion gases subsequently exit the engines 14, 16 as the exhaust gases, which includes a variety of emissions (e.g., $NO_x$, carbon monoxide (CO), ammonia ($NH_3$), etc.). The hybrid power plant controller 12 may generate operational setpoints to reduce the emissions generated during operation of the engines 14, 16 to remain below a threshold level. The hybrid power plant controller 12 may optimize performance of the hybrid power plant 10 by balancing a maximum power output of the hybrid power plant 10 against an acceptable level of emissions.

The hybrid power plant 10 may also include a catalyst system 18. The catalyst system 18 may be coupled to the gas turbine engine 14, the gas engine 16, or both the gas turbine 14 and the gas engine 16. The catalyst system 18 may include a selective catalyst reduction (SCR) catalyst assembly, an oxidation catalyst assembly, any other suitable catalyst assembly, or a combination thereof. Additionally, it should be understood that the embodiments disclosed herein are not limited to the use of one catalyst system 18, but may also multiple catalyst assemblies 18. The catalyst system 18 may be used to treat the emission generated by the engines 14, 16 via its catalytic activity. For example, $NO_x$ may be reduced via a gaseous reductant (e.g., urea) to generate $N_2$, $CO_2$, and $H_2O$, and $NO_x$ may be reduced via anhydrous or aqueous ammonia to generate $N_2$ and $H_2O$. Several secondary reactions may occur with anhydrous or aqueous ammonia resulting in ammonia sulfate and ammonia hydrogen sulfate.

The hybrid power plant controller 12 may generate operational setpoints to optimize control of the catalyst system 18. For example, the hybrid power plant controller 12 may receive input from one or more catalyst sensors 32 disposed upstream or downstream of the catalyst system 18. The sensors catalyst sensors 32 may detect various emissions from the catalyst system 18. The hybrid power plant controller 12 may generate catalyst operational setpoints 44 based on aging of the catalyst system 18, desired reduction levels, operating temperatures, and so forth. Utilizing the various operating parameters of the hybrid power plant 12 enables the hybrid power plant controller 12 to optimize the plant 10 performance by utilizing closed-loop optimal control. The hybrid power plant controller 12 may also be programmed to utilize a dynamic scheduler to generate the operational setpoints based on various operating parameters, as described above. The hybrid power plant controller 12 may also receive other input from the hybrid power plant 10. For example, the hybrid power plant controller 12 may utilize input 72 pertaining to the gas turbine acoustics (e.g., frequencies), and input 74 for other operating parameters of the hybrid power plant 10, or a combination thereof.

The hybrid power plant controller 12 may also utilize other input received from the gas turbine engine controller 20 (e.g., controller input 66), the gas engine controller 22 (e.g., controller input 68), and the catalyst controller 24 (e.g., controller input 70). For example, the hybrid power plant controller 12 may utilize input from the gas turbine engine controller 20, the gas engine controller 22, and the catalyst controller 24 to adjust or optimize the operating setpoints based on the current operation of the gas turbine engine 14, the gas engine 16, and the catalyst system 18, respectively. In order to adjust the operations of the hybrid power plant 10 to reach the operating setpoints, the hybrid power plant controller 12 may generate one or more control signals to generate the operating setpoints. For example, the hybrid power plant controller 12 may generate a gas turbine control signal 50. The gas turbine control signal 50 may include a megawatt signal for the gas turbine engine 14. The hybrid power plant controller 12 may generate a gas engine control signal 52. The gas engine control signal 52 may include a target air to fuel ratio to adjust the gas engine 16 operating parameters to reach. The hybrid power plant controller 12 may generate a catalyst control signal 54. The catalyst control signal 54 may include a target amount of reductant to inject into the catalyst system 18. As described above, the control signals 50, 52 may be based in part on an emissions reduction level, a desired operating efficiency, or a combination thereof.

Figure 2:
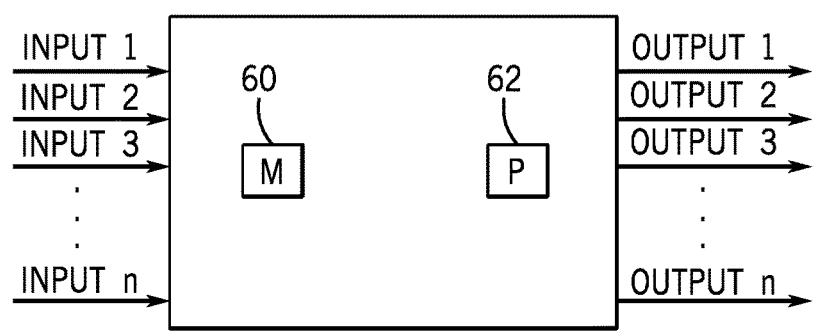
FIG. 2 is a block diagram of an embodiment of the controller (e.g., an electronic control unit (ECU))

FIG. 2 is a block diagram of an embodiment of the controller 12 (e.g., an electronic control unit (ECU)). The controller 12 may include the gas turbine engine controller 20, the gas engine controller 22, and/or the catalyst controller 24. As described above, the hybrid power plant controller 12 generally outputs the control signals (e.g., the gas turbine control signal 50, the gas engine control signal 52, the catalyst control signal 54) based at least in part on the on the input received by the sensors 26 and the gas turbine acoustics (e.g., frequencies) and/or other operating parameters of the hybrid power plant 10. As described above, the input received by the hybrid power plant controller 12 may be representative of various operating conditions of the hybrid power plant 10. The input may include gas turbine 14 emissions input (e.g., concentrations, emissions), gas engine 16 emissions input (e.g., concentrations, emissions), catalyst system 18 input (e.g., exhaust flow temperature), gas turbine engine controller 20 input, gas engine controller 22 input, catalyst controller 24 input, gas turbine acoustics input, or any combination thereof.

The controller 12 includes non-transitory code or instructions stored in a machine-readable medium (e.g., memory 60) and used by a processor 62 (e.g., multiple microprocessors, one or more "general-purpose" microprocessors, one or more special-purpose microprocessors, and/or circuits some other processor configuration) to implement the techniques disclosed herein. The memory 60 may store various tables and/or models (e.g., software models representing and/or simulating various aspects of the hybrid power plant 10, the catalyst system 18, and each engine 14, 16 of the hybrid power plant 10). In certain embodiments, the memory 60 may be wholly or partially removable from the controller 12. The controller 12 receives one or more input signals from sensors ($input_1 \ldots input_n$) including engine inputs, and other components of the hybrid power plant 10 and outputs one or more output signals ($output_1 \ldots output_n$). The various input signals may include engine outputs (e.g., temperature, flow rate), emissions concentrations (e.g., $NH_3$ concentration), conditions of the catalyst system, acoustic frequencies from the gas turbine engine, or other operating conditions of the hybrid power plant 10. The output signals may include the gas turbine control signal 50 to reach a target megawatt value for the gas turbine engine, the gas engine control signal 52 to adjust a target air to fuel ratio to adjust the gas engine 16, or the catalyst control signal 54 to control the amount of reductant to inject into the catalyst system 18. The control signals 50, 52 may be based in part on an emissions reduction level, a desired operating efficiency, or a combination thereof. The controller 12 may utilize one or more types of models (e.g., software-based models executable by a processor). For example, the models may include statistical models, such as regression analysis models. Regression analysis may be used to find functions capable of modeling future trends within a certain error range. Association techniques may be used to find relationship between variables. Also, the data utilized with the models may include historical data, empirical data, knowledge-based data, and so forth.

Figure 3:
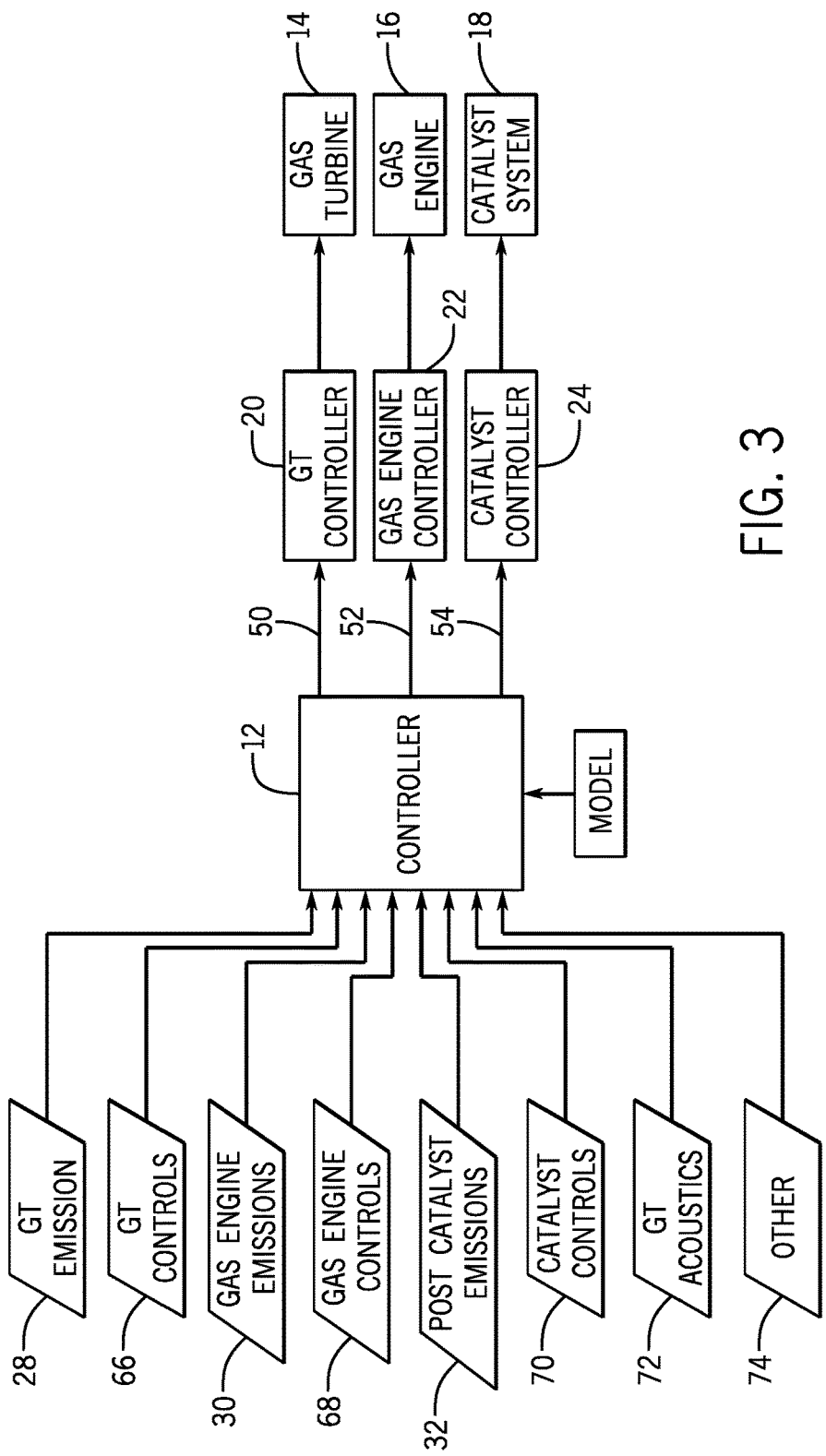
FIG. 3 is a schematic diagram of the functional operation of the controller to generate operational setpoints based on the operating parameters of the hybrid power plant.

FIG. 3 is a schematic diagram of the functional operation of the controller 12 to generate operational setpoints 50, 52, 54 based on the operating parameters of the hybrid power plant 10. The controller 12 receives signals representative of emissions levels of the exhaust flows from the engines 14, 16 from the gas turbine engine sensors 28 and the gas engine sensors 30. The controller 12 may receive signals representative of catalyst system conditions from the catalyst sensors 32. It may be appreciated that any of the sensors 28, 30, or 32 may be disposed upstream or downstream of the gas turbine engine 14, the gas engine 16, or the catalyst system 18, respectively. The controller 12 also receives input from the various controllers disposed within the hybrid power plant 10. For example, the controller 12 may receive input 66 from the gas turbine controller 20 pertaining to the operation of the gas turbine 14. The controller 12 may also receive input 68 from the gas engine controller 22 pertaining to the operation of the gas engine 16. The controller 12 may receive input 70 from the catalyst system controller 24. The input 70 may relate to catalyst system aging, desired emissions reduction levels, or any other conditions pertaining to the control of the catalyst system 18. The controller 12 also receives input 72 of resonance frequencies of the gas turbine engine 14 and input 74 indicative of other operating conditions of the hybrid power plant 10.

In an exemplary embodiment, the controller 12 may use a kinetics-based model to determine the control signals 50, 52, 54 that may output to control operation of the hybrid power plant 10. As described above, the control signals 50, 52, 54 may provide target operating conditions for the gas turbine engine 14, the gas engine 16, and the catalyst system 18 such that the hybrid power plant 10 operates according to the desired operating efficiency. The output signals may include the gas turbine control signal 50 to reach a target megawatt value for the gas turbine engine 14, a target emissions reduction level, a target operating efficiency, or a combination thereof. The gas engine control signal 52 may adjust a target air to fuel ratio to adjust the gas engine 16, a target emissions reduction level, a target operating efficiency, or a combination thereof. The catalyst control signal 54 to control the amount of reductant to inject into the catalyst system 18. At any time during the operation, an operator may interrupt the automatic control sequence of the controller 12 as described herein and manually change the operating parameters away from the optimized operating conditions generated by the control signals 50, 52, 54.

Figure 4:
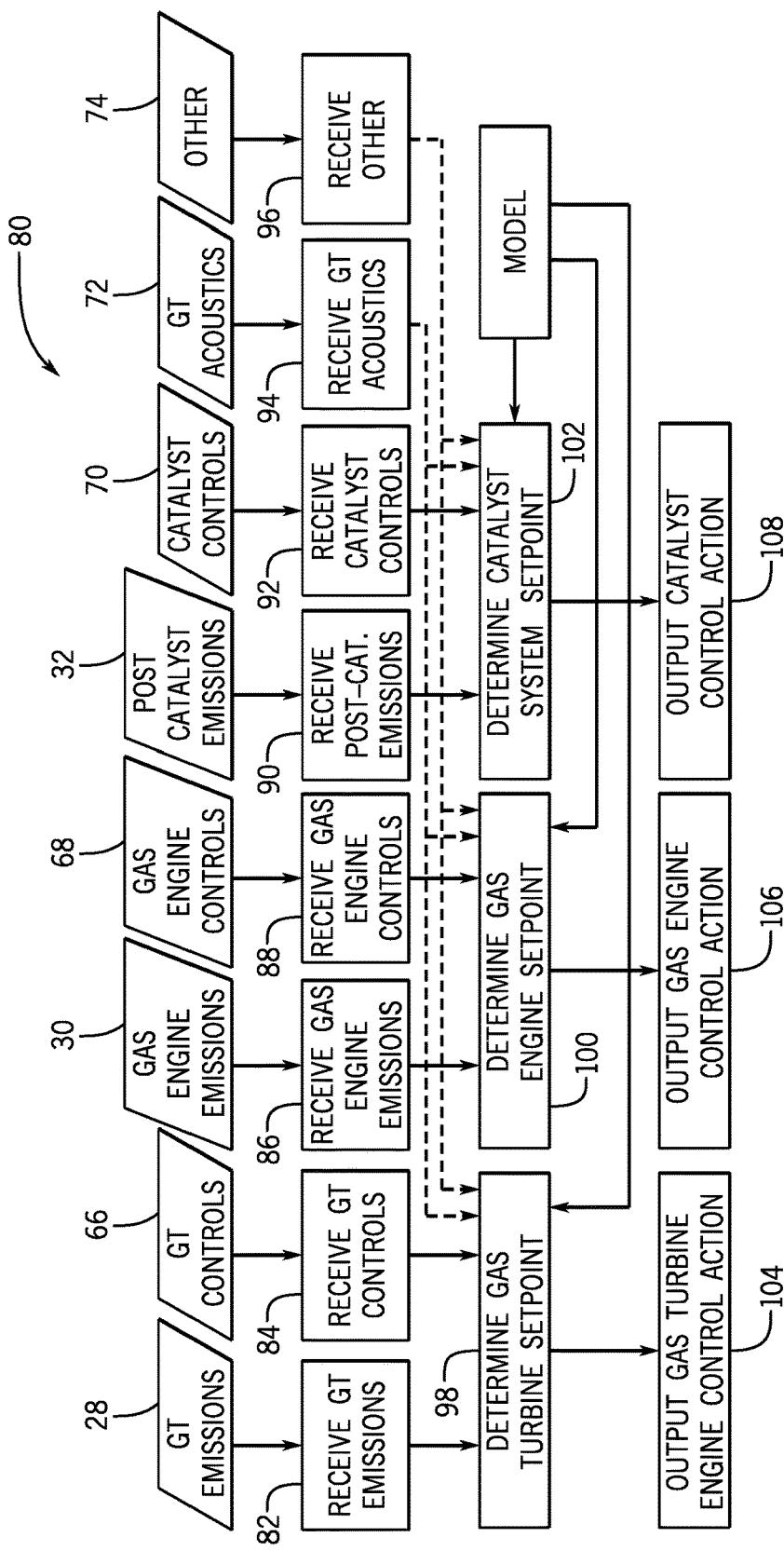
FIG. 4 is a flow chart of an embodiment of a computer-implemented method for controlling the operations of the hybrid power plant.

FIG. 4 is a flow chart of an embodiment of a computer-implemented method 80 for controlling the operations of the hybrid power plant 10. All or some of the steps of the method 80 may be executed by the controller 12 (e.g., utilizing the processor 62 to execute programs and access data stored on the memory 60). The method 80 includes receiving (block 82) gas turbine engine emissions input and receiving (block 84) gas turbine controls input. The method 80 includes receiving (block 86) gas engine emissions input and receiving (block 88) gas engine controls input. The method 80 includes receiving (block 90) catalyst emissions input and receiving (block 92) catalyst controls input. The method 80 includes receiving (block 94) gas turbine acoustics input and receiving (block 96) other input. The method 80 includes determining (block 98) the gas turbine engine operating setpoint by utilizing the input received and determining optimal operating conditions for the gas turbine engine. The method 80 includes determining (block 100) the gas engine operating setpoint by utilizing the input received and determining optimal operating conditions for the gas engine. The method 80 includes determining (block 102) the catalyst system operating setpoint by utilizing the input received and determining optimal operating conditions for the catalyst system. The method 80 includes using a model to generate the operating setpoints. The method 80 includes outputting (block 104) a gas turbine engine control action, outputting (block 106) a gas engine control action, and outputting (block 108) a catalyst system control action. It may be appreciated that the method 80 may be implemented in its entirety or the method 80 may be partially implemented. For example, in some embodiments, it may be desirable to implement only some of the output control actions (e.g., determining the gas turbine setpoint), while not implementing other output control actions (e.g., determining the gas engine setpoint).

Technical effects of the subject matter include utilizing a dynamic scheduler and a controller to determine optimal operating setpoints for equipment in the hybrid power plant. The controller generates an optimal operating setpoint for the catalyst system, the gas engine, the gas turbine engine, or any combination thereof. The controller receives input representative of the gas turbine engine emissions, the gas engine emissions, and the catalyst system emissions, input from the gas turbine controller, input from the gas engine controller, and input from the catalyst system controller. The controller may receive input representative of the resonance frequencies associated with the gas turbine engine, other hybrid power plant conditions, or a combination thereof.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a hybrid power plant controller programmed to receive a plurality of signals representative of one or more operating parameters of a hybrid power plant comprising at least one gas turbine engine, at least one piston engine, and at least one catalyst system, wherein the one or more operating parameters comprise at least gas turbine acoustics, and;
wherein the hybrid power plant controller is programmed to utilize closed-loop optimal control to generate one or more operational setpoints based on the one or more operating parameters for the hybrid power plant to control performance of the hybrid power plant and to provide the one or more operational setpoints to respective controllers of the at least one gas turbine engine, the at least one piston engine, and the at least one catalyst system to control operation of the at least one gas turbine engine, the at least one piston engine, and the at least one catalyst system.

2. The system of claim 1, wherein the hybrid power plant controller is programmed to utilize a dynamic scheduler to generate the one or more operational setpoints based on the one or more operating parameters.

3. The system of claim 1, wherein the hybrid power plant controller is programmed to control the performance of the hybrid power plant as a function of emissions and efficiency.

4. The system of claim 3, wherein the hybrid power plant controller is programmed to optimize the performance of the hybrid power plant by maximizing power output of the hybrid power plant while minimizing emissions from the power plant.

5. The system of claim 1, wherein the hybrid power plant controller is programmed to control the performance of the hybrid power plant in response to aging of catalytic activity in the at least one catalyst system.

6. The system of claim 1, wherein the one or more operating parameters comprises emissions levels of the hybrid power plant.

7. The system of claim 6, wherein the one or more operating parameters comprises emissions levels from the at least one gas turbine engine prior to treatment with the at least one catalyst system, emissions levels from the at least one piston engine prior to treatment with the at least one catalyst system, and emissions levels from both the at least one gas turbine engine and the at least one piston engine after treatment with the at least one catalyst system.

8. The system of claim 6, wherein the one or more operating parameters comprises control signals for components of the hybrid power plant.

9. The system of claim 8, wherein the control signals comprise a megawatt signal for the at least one gas turbine engine, an air to fuel ratio for the piston engine, and an amount of reductant to inject into at least one catalyst system.

10. The system of claim 8, wherein the one or more operating parameters comprises combustion dynamics of the at least one gas turbine engine.

11. The system of claim 1, comprising the hybrid power plant comprising the at least one gas turbine engine, the at least one piston engine, and the at least one catalyst system.

12. The system of claim 11, wherein the at least one catalyst system comprises an oxidation catalyst assembly and a selective catalytic reduction catalyst assembly.

13. A hybrid power plant, comprising:
a gas turbine engine;
a piston engine;
a catalyst system configured to treat emissions from both the gas turbine engine and the piston engine, wherein the catalyst system comprises an oxidation catalyst assembly and a selective catalytic reduction (SCR) catalyst assembly;
a plurality of sensors disposed throughout the hybrid power plant, wherein the plurality of sensors are configured to detect a plurality of operating parameters of the hybrid power plant, wherein the plurality of operating parameters comprises at least gas turbine acoustics; and
a controller coupled to the gas turbine engine, the piston engine, and the catalyst system, wherein the controller is programmed to receive a plurality of signals representative of the plurality of operating parameters from at least the plurality of sensors, to utilize closed-loop optimal control to generate a plurality of operational setpoints based on the plurality of operating parameters of the hybrid power plant to optimize performance of the hybrid power plant, and to provide respective operational setpoints of the plurality of operation setpoints to respective controllers of the gas turbine engine, the piston engine, and the catalyst system to control relative usage of the gas turbine engine, the piston engine, and the catalyst system based in part on the plurality of operating parameters and the plurality of operational setpoints to meet a target power output, an emissions limit, or a plant constraint.

14. The hybrid power plant of claim 13, wherein the respective controllers comprise:
a gas turbine engine controller coupled to the gas turbine engine and programmed to control operation of the gas turbine engine;
a piston engine controller coupled to the piston engine and programmed to control operation of the piston engine; and
a catalyst controller coupled to the catalyst system and programmed to control operation of the catalyst system.

15. The hybrid power plant of claim 14, wherein the controller is programmed to receive a gas turbine engine control input signal from the gas turbine engine controller, a piston engine control input signal from the piston engine controller, and a catalyst control input signal from the catalyst controller, and the controller is programmed to generate the plurality of operational setpoints based on the gas turbine engine control input, the piston engine control input signal, and the catalyst control input signal, and the plurality of operating parameters of the hybrid power plant to optimize performance of the hybrid power plant.

16. The hybrid power plant of claim 15, wherein the gas turbine engine control input signal comprises a megawatt signal for the gas turbine engine, an air to fuel ratio for the gas engine, and an amount of reductant to inject into the catalyst system.

17. The hybrid power plant of claim 13, wherein the one or more operating parameters detected by the plurality of sensors comprises emissions levels from the gas turbine engine prior to treatment with the at least one catalyst system, emissions levels from the piston engine prior to treatment with the catalyst system, and emissions levels from both the gas turbine engine and the piston engine after treatment with the catalyst system.

18. The hybrid power plant of claim 17, wherein the plurality of operational setpoints comprises a first operational setpoint for the gas turbine engine, a second operational setpoint for the piston engine, and a third operational setpoint for the catalyst system, wherein the first operational setpoint causes the gas turbine engine to maximize power output while minimizing fuel consumption, the second operational setpoint causes the piston engine to maximize power output while minimizing fuel consumption, and the third operational setpoint causes the catalyst system to maximize a conversion of the emissions from both the gas turbine engine and the piston engine.

19. The hybrid power plant of claim 13, wherein the controller is programmed to utilize a dynamic scheduler to generate the plurality of operational setpoints based on the plurality of operating parameters.

20. A method of operating a hybrid power plant comprising a gas turbine engine, a piston engine, and a catalyst system, comprising:
receiving, at a processor, a plurality of signals representative of a plurality of operating parameters of the hybrid power plant, the plurality of operating parameters comprising at least gas turbine acoustics;
utilizing, via the processor, closed-loop optimal control to generate a plurality of operational setpoints based on the plurality of operating parameters to optimize performance of the hybrid power plant;
providing, via the processor, respective setpoints of the plurality of operational setpoints to respective controllers of the gas turbine engine, the piston engine, and the catalyst system to control operation of the gas turbine engine, the piston engine, and the catalyst system; and
operating, via the respective controllers, the gas turbine engine, the piston engine, and the catalyst system at the respective setpoints of the plurality of operation setpoints.

* * * * *